April 11, 1961 R. S. HANMER 2,979,481
CARBON BLACK-RUBBER MASTERBATCH PRODUCTION
Filed Dec. 26, 1956
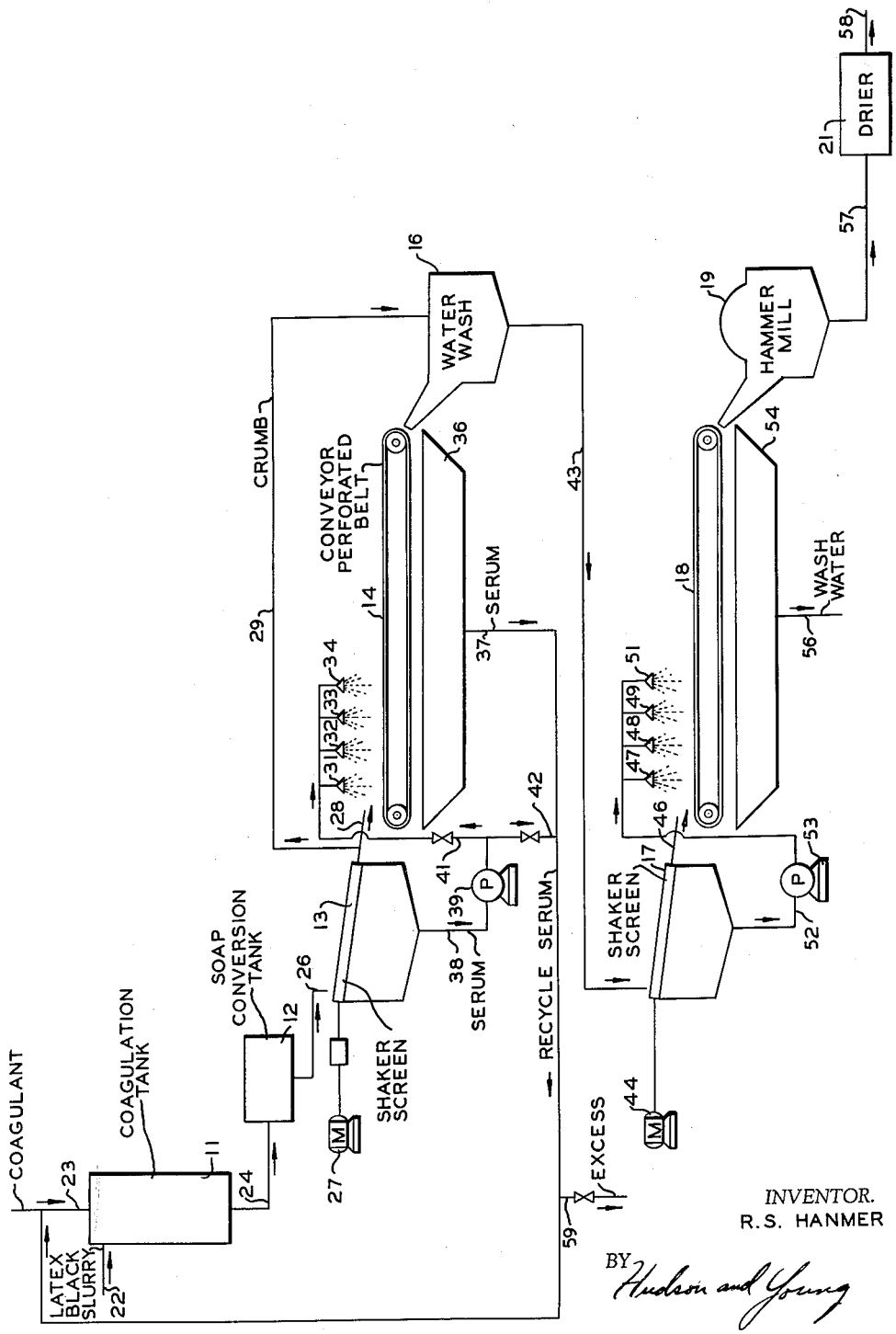
INVENTOR.
R.S. HANMER
BY Hudson and Young
ATTORNEYS

United States Patent Office 2,979,481
Patented Apr. 11, 1961

2,979,481

CARBON BLACK-RUBBER MASTERBATCH PRODUCTION

Robert S. Hanmer, Bartlesville, Okla., assignor to Phillips Petroleum Company, a corporation of Delaware Filed Dec. 26, 1956, Ser. No. 630,551

5 Claims. (Cl. 260—41.5)

This invention relates to carbon black-rubber masterbatch production. In a further aspect this invention relates to carbon-black rubber masterbatch production wherein losses due to fines are reduced. In a further aspect this invention relates to apparatus for carrying out this method.

A problem exists in the production of such masterbatches in that a considerable amount of the product is lost as fines during its production. Usual operation involves separating the coagulum from the serum, which may be reurned to the coagulation zone, and then to wash the coagulum with water, separate the water from the coagulum and further process the coagulum. Fines are lost in the serum and in the water from the subsequent washing operation. Losses of fines in the serum are small since this stream is usually returned to the coagulation zone except for the small portion which is discarded as excess.

The following are objects of my invention.

An object of my invention is to provide an improved process for the production of carbon black-rubber masterbatch. A further object of my invention is to provide a process for the production of this masterbatch wherein losses due to fines are minimized. A further object of my invention is to provide apparatus for preparing carbon black-rubber masterbatch wherein losses due to fines are minimized.

Other objects and advantages of my invention will be apparent to one skilled in the art upon reading this application.

Accompanying and forming a part of this specification is a drawing showing, partly schematically, the process and apparatus of my invention.

A well-known practice in the rubber industry is to prepare rubber-carbon black masterbatches by a latex masterbatching operation, i.e., a carbon black slurry is blended with a rubber latex and the mixture is coagulated. An extender oil can also be added, if desired, and the mixture coagulated to give a rubber-carbon black-extender oil composition. In the usual procedure, the mixture of rubber latex and carbon black is first passed to a coagulation tank where a coagulant such as brine-acid is added and it is then transferred to a soap conversion zone where sufficient time is allowed for conversion of the soap to acid. Obviously, other coagulation systems can be used. The mixture is transferred to a shaker screen where rubber crumb containing carbon black is separated from the serum. The serum which contains some fines, excess acid, and salt, is usually recycled to the acid-salt make-up stream to the coagulation tank. An outlet is provided in the recycle line for bleeding off excess liquid. Rubber crumb from the shaker screen is passed to a zone where it is water washed. It is then transferred to another shaker screen to effect separation of the crumb from the wash water and thence to further processing steps, such as to hammer mill and a drier, while the wash water containing fines is discharged as waste.

A much larger percentage of fines results from the washing operation than from the first separation of rubber crumb from serum and considerable losses result when no provision is made for recovery of the fines. Filtration of the washed crumb is difficult on account of the tendency of the very fine particles to clog the shaker screen which is constructed of the finest mesh material that is practicable in order to minimize the fines losses.

I have discovered that if the rubber crumb containing carbon black is transferred from the shaker screen to a perforated rolling belt and the serum or wash water is sprayed or otherwise made to flow evenly over the layer of crumb on the belt, there is a substantial reduction in fines losses. The rubber crumb provides a continuously renewed filter medium through which the liquid containing the fines is passed. By operating in this manner, a substantial proportion of the fines is retained by the rubber crumb and losses are materially reduced. The roller belt should be long enough to permit the crumb to drain to not over 40 and preferably not over 30 weight percent moisture after the liquid has filtered through it.

One important advantage in operating according to the process of my invention is that the shaker screen can be of coarser mesh than is ordinarily employed thus alleviating the plugging problem to a large extent. The fact that a larger quantity of fine particle size rubber will pass through a coarser screen is of little consequence as it will be retained by the crumb on the roller belt as the serum is sprayed over it. Whereas screens of approximately 100 mesh, say 90 to 150 mesh have been considered necessary, the use of my invention permits use of screens in the range of 40 to 80 mesh.

My invention can probably be best understood by reference to the accompanying drawing. In this drawing the principal pieces of apparatus used in carrying out my invention comprise a coagulation tank 11, a soap conversion tank 12, a first shaker screen 13, a first perforated conveyor belt 14, a water wash tank 16, a second shaker screen 17, a second perforated conveyor belt 18, a hammer mill 19, and a dryer 21. Coagulation tank 11 is provided with inlet conduit 22 by means of which a mixture of latex and carbon black slurry is supplied to said coagulation tank. Coagulant is supplied through conduit 23. The effluent from coagulation tank 11 is passed to soap conversion tank 12 by means of conduit 24. From soap conversion tank 12 the mixture of carbon black-rubber crumb and liquid is passed to shaker screen 13 by means of conduit 26. The shaker screen is powered by motor 27. Solid material conduit 28 is provided for conveying material from first shaker 13 to perforated conveyor belt 14 and conduit 29 is provided to convey solid material from first shaker 13 to water wash tank 16. Spray means 31, 32, 33, and 34 are provided adjacent the upstream end of perforated conveyor belt 14. Liquid passing through perforated conveyor belt 14 is collected in tank 36 which is provided with outlet conduit 37, this conduit extending to and communicating with coagulant supply conduit 23. A liquid removal conduit 38 having pump 39 therein extends from the lower portion of shaker 13. Conduit 41 extends from the downstream end of conduit 38 to spray means 31 through 34, previously described. Conduit 42 connects conduit 38 with conduit 37. Extending from the bottom of wash tank 16 there is provided conduit 43 which communicates with and extends to the upstream end portion of second shaker screen 17. Shaker screen 17 is powered by motor 44. Extending from shaker screen 17 is conduit 46, this conduit conveying solid material to the upstream end of perforated conveyor belt 18. Conveyor belt 18 is provided with spray means 47, 48, 49, and 51. Extending from the lower end portion of shaker screen 17 is liquid conduit 52, having pump 53 therein, conduit 52 extending to spray means 47 through 51. Liquid passing through perforated conveyor belt 18 is collected in tank 54 and conveyed to waste by means of conduit 56.

Hammer mill 19 is provided at the downstream end of perforated conveyor belt 18. Solid material from hammer mill 19 is conveyed to dryer 21 by means of conduit 57 and the product from dryer 21 is recovered at line 58.

From this drawing the operation of my improved process should be evident. The mixture of latex and black slurry are coagulated in coagulation tank 11 by conventional means and passed to soap conversion tank 12 wherein the soap is converted to the acid. The coagulum is passed to shaker screen 13 wherein it is separated from the serum. At this point, alternative processes are possible within the scope of my invention. In one method, the crumb is passed directly to wash tank 16 by means of conduit 29 and the serum is passed by means of conduits 38, 42, and 37 to the coagulation tank 11. A portion of the serum is discarded through conduit 59. Following washing of the coagulum with water, the water and crumb is passed to shaker screen 17 by means of conduit 43. Coagulum is passed from shaker screen 17 to perforated conveyor belt 18 by means of conduit 46, being distributed on the conveyor belt by suitable means. The separated wash water containing a considerable amount of fines is passed by means of conduit 52 to spray means 47, 48, 49, and 51. This liquid containing the fines is sprayed upon the layer of rubber crumb and the major amount of the fines are deposited upon and stick to the rubber crumb. The wash water, substantially free of fines, passes through the belt and collected in tank 54 from which it is passed to waste or other use through conduit 56. The crumb continues to pass along the perforated conveyor belt 18 and drains to a moisture content preferably not above 30 or 40 weight percent water. The crumb passes from the downstream end of conveyor belt 18 to hammer mill 19 wherein it is disintegrated. It is passed to dryer 21 by means of conduit 57 wherein a product of the desired moisture content is produced.

Alternatively, the crumb from shaker screen 13 can be distributed upon perforated conveyor belt 14 by means of supply conduit 28. In this modification the serum recovered from shaker screen 13 is passed by means of conduits 38 and 41 to liquid spray means 31, 32, 33, and 34. Substantially all of the fines in this serum are deposited upon the rubber crumb on perforated conveyor belt 14. The serum is collected in tank 36 and passes by means of conduit 37 to the coagulation tank 11, a small portion of this recycle serum being discarded through conduit 59.

From the downstream end of perforated conveyor belt 14 the rubber crumb passes to water wash tank 16. In this modification it is also desirable to have a belt of sufficient length so that a considerable portion of the serum drains from the rubber crumb prior to its introduction into wash tank 16, this reducing the amount of wash water required.

The second modification just described provides the additional advantage in that fines are removed from the recycle serum and the fines are not lost in the small portion of material which is discarded. However, since the amount discarded is small, the additional equipment required for this modification is sometimes considered unnecessary. Obviously, fines recycled to the coagulation tank are not lost.

The following specific example is given as illustrative of the manner of carrying out the present invention and demonstrates the specific improvement obtained thereby. However, it should be understood that our invention is not limited to this specific example.

*Example*

Butadiene and styrene are copolymerized in aqueous emulsion at 41° F. in accordance with the following recipe:

| | Parts by weight |
|---|---|
| Butadiene | 72 |
| Styrene | 28 |
| Water | 180 |
| Rosin soap, K salt | 4.5 |
| KOH | 0.1 |
| KCl | 0.4 |
| Tamol N [1] | 0.1 |
| Sequestrene AA [2] | 0.02 |
| $FeSO_4 \cdot 7H_2O$ | 0.01 |
| $NaSO_2CH_2OH \cdot 2H_2O$ [3] | 0.05 |
| p-Menthane hydroperoxide | 0.05 |
| Tert-dodecyl mercaptan | 0.23 |

[1] Sodium salt of a naphthalene sulfonic acid-formaldehyde condensation product.
[2] Ethylenediamine tetraacetic acid.
[3] Sodium formaldehyde sulfoxylate.

The reaction is shortstopped with 0.15 part Thiostop N (sodium dimethyldithiocarbamate), based on monomers, and 1.5 parts by weight of phenyl-beta-naphthylamine antioxidant is added per 100 parts rubber. A conversion of 60 percent is reached in 15.2 hours. A polymer thus prepared has a Mooney value (ML-4) of approximately 58.

A carbon black slurry using high abrasion furnace black is prepared in accordance with the following recipe:

| | Parts by weight |
|---|---|
| Carbon black | 50 |
| Marasperse [1] | 2 |
| NaOH | 0.2 |
| Water | 240 |

[1] Sodium lignin sulfonate.

The carbon black slurry is blended with the rubber latex in proportions such that 50 parts by weight of carbon black is employed per 100 parts rubber. This latex masterbatch is fed to the coagulation tank where brine and acid are added and thence to the soap conversion zone where conversion of the soap to acid occurs. The material is passed from the soap conversion zone to a shaker screen where the serum is separated from the rubber crumb containing carbon black. Serum is recycled to the brine-acid make-up line. Provision is made in the recycle line for withdrawal of excess liquid as necessary. Rubber crumb from the shaker screen is transferred to a washing tank where it is washed with water, passed to another shaker screen, and then to a perforated roller belt. A layer of rubber crumb is formed on the belt. The wash water or serum is pumped through a transfer line to spray nozzles where it is spread evenly over the surface of the rubber crumb. The crumb drains to a moisture content of not over 30 to 40 weight percent water and is then passed to a hammer mill and finally to a drier. The loss of rubber as fines is only 1.1 weight percent when operating in this manner.

When the run is repeated without provision for recovery of fines from the wash water from the second shaker screen, the loss of rubber as fines is 4.6 weight percent.

The emulsifiers which can be used include not only the soaps such as alkali metal or ammonium stearates, oleates, rosinates, and the like, but also alkali metal aralkyl sulfonates, aryl sulfonates, sodium lignin sulfonates, mercaptan ethylene oxide condensation products, phenol ethylene oxide condensation products, etc. Mixtures of emulsifiers are frequently used. As the emulsifier or mixture thereof is varied, it will, in some instances, be necessary to vary the coagulation system. For instance, alcohols are used as coagulation agents in some cases.

As many possible embodiments may be made from my invention without departing from the scope thereof, it is to be understood that all matter herein set forth is to be interpreted as illustrative and not as unduly limiting the invention.

I claim:
1. In the process of producing carbon black-rubber masterbatch wherein a latex-carbon black slurry is coagulated to form a crumb, the improvement comprising passing liquid separated from the crumb and containing fines through a mass of the crumb thereby removing said fines from said liquid.

2. The process of reducing loss of fines in the production of carbon black-rubber crumb, comprising mixing rubber latex with a carbon black slurry; coagulating solids in the resulting mixture; removing the resulting crumb from the serum; washing said crumb with water; separating wash water from said crumb, said wash water containing fines; and passing said wash water containing fines through said crumb, said crumb serving to remove fines from said wash water.

3. The process of reducing loss of fines in the production of carbon black-rubber crumb, comprising mixing rubber latex with a slurry of carbon black in water; coagulating solids in the resulting mixture in a coagulation zone; removing the resulting crumb from the serum; returning at least the major portion of the serum to the coagulation zone; washing said crumb with water; separating wash water from said crumb, said wash water containing fines; forming a layer of said crumb; spraying said wash water containing fines onto said layer of crumb, said layer of crumb serving to remove fines from said wash water; draining sufficient wash water from said crumb to provide a crumb containing not more than 40 weight percent moisture; disintegrating said drained crumb, passing resulting disintegrated crumb to a drying zone; and recovering resulting dry carbon black-rubber crumb.

4. The process of preparing dry carbon black-rubber crumb comprising mixing rubber latex containing a soap emulsifier with a slurry of carbon black in water; coagulating solids in the resulting mixture by adding an aqueous solution of brine and acid in a coagulation zone and holding the mixture in a soap conversion zone until coagulation is complete; removing serum from the resulting crumb, said serum containing fines; forming a layer of said crumb; spraying removed serum containing fines on said layer, said layer of crumb serving to remove fines from said serum; returning at least the major portion of said serum to said coagulation zone; washing said crumb with water; separating wash water from said crumb, said wash water containing fines; forming a layer of said crumb; spraying said wash water containing fines onto said layer of crumb, said layer of crumb serving to remove fines from said wash water; straining sufficient wash water from said crumb to provide a crumb containing not more than 40 weight percent moisture, breaking up said drained crumb; drying the crumb following said breaking up; and recovering resulting dry carbon black-rubber crumb.

5. In the process of producing carbon black-rubber masterbatch wherein a slurry of carbon black and a butadiene-styrene copolymer is coagulated to form a crumb, the improvement comprising passing liquid separated from the crumb and containing fines through a mass of the crumb, thereby removing said fines from said liquid.

References Cited in the file of this patent

UNITED STATES PATENTS

| | | |
|---|---|---|
| 2,218,836 | Von Kohorn zu Hornegg | Oct. 22, 1940 |
| 2,509,664 | Amon et al. | May 30, 1950 |
| 2,640,042 | Howland et al. | May 26, 1953 |
| 2,767,065 | Hoggatt et al. | Oct. 16, 1956 |